US 11,162,915 B2

(12) United States Patent
Meng et al.

(10) Patent No.: US 11,162,915 B2
(45) Date of Patent: Nov. 2, 2021

(54) BUILT-IN ELECTRODE ELECTRICAL CAPACITANCE TOMOGRAPHY SENSOR

(71) Applicant: Dalian Institute of Chemical Physics, Chinese Academy of Sciences, Dalian (CN)

(72) Inventors: Shuanghe Meng, Dalian (CN); Mao Ye, Dalian (CN); Kai Huang, Dalian (CN); Qiang Guo, Dalian (CN); Jingjing Shen, Dalian (CN); Tao Zhang, Dalian (CN); Zhongmin Liu, Dalian (CN)

(73) Assignee: Dalian Institute of Chemical Physics, Chinese Academy of Sciences, Dalian (CN)

( * ) Notice: Subject to any disclaimer, the term of this patent is extended or adjusted under 35 U.S.C. 154(b) by 0 days.

(21) Appl. No.: 17/052,910

(22) PCT Filed: Apr. 28, 2019

(86) PCT No.: PCT/CN2019/084748
§ 371 (c)(1),
(2) Date: Nov. 4, 2020

(87) PCT Pub. No.: WO2019/214471
PCT Pub. Date: Nov. 14, 2019

(65) Prior Publication Data
US 2021/0239642 A1    Aug. 5, 2021

(30) Foreign Application Priority Data
May 8, 2018    (CN) .......................... 201810432339.7

(51) Int. Cl.
*G01N 27/22*    (2006.01)
(52) U.S. Cl.
CPC .................................. *G01N 27/226* (2013.01)

(58) Field of Classification Search
CPC .................................................... G01N 27/226
See application file for complete search history.

(56) References Cited

U.S. PATENT DOCUMENTS 9,791,396 B2    10/2017    Marashdeh et al.
2006/0176062 A1*    8/2006    Yang ...................... G01V 3/08
                                                              324/663

(Continued)

FOREIGN PATENT DOCUMENTS

CN          1538168 A          10/2004
CN        102156225 A          8/2011
(Continued)

OTHER PUBLICATIONS

Jie Zheng, First Office Action: International Application No. 20181043239.7 Original and English Translation, dated Mar. 11, 2020, The State Intellectual Property Office of People's Republic of China, China.

(Continued)

*Primary Examiner* — Alvaro E Fortich
(74) *Attorney, Agent, or Firm* — Edwin A. Sisson, Attorney at Law, LLC; Jeffrey J. Banyas (57) ABSTRACT

A built-in electrode electrical capacitance tomography sensor, characterized in that the electrical capacitance tomography sensor is a barrel sensor, and sequentially comprises, from inside to outside, an array distribution electrode (1), an electrode insulating sleeve (2), a flange outer tube (3), an insulating tube (4) and a signal transmission line. The array distribution electrode (1) includes N electrode sheets of the same size and consists of measurement ends and fixed ends, N being an integer of 8-16. The electrode is connected to an electrical capacitance tomography signal acquisition system (13) by means of a transmission line, and the acquired electrical capacitance data is sent to the electrical capacitance tomography signal acquisition system (13) by means (Continued)

of a signal transmission line, and is then sent to an imaging computer by means of the electrical capacitance tomography signal acquisition system (13) so as to complete image reconstruction.

18 Claims, 4 Drawing Sheets

(56) References Cited

U.S. PATENT DOCUMENTS

| | | | |
|---|---|---|---|
| 2010/0097374 A1* | 4/2010 | Fan | G01N 27/226 345/420 |
| 2010/0332170 A1 | 12/2010 | Gao et al. | |
| 2012/0013354 A1* | 1/2012 | Bowler | G01N 27/226 324/664 |
| 2013/0144548 A1* | 6/2013 | Xie | G01F 1/60 702/65 |

FOREIGN PATENT DOCUMENTS

| | | |
|---|---|---|
| CN | 103439375 A | 12/2013 |
| CN | 105353004 A | 2/2016 |
| CN | 103604843 B | 1/2017 |
| CN | 106370705 A | 2/2017 |
| CN | 106556629 A | 4/2017 |
| CN | 106896143 A | 6/2017 |
| JP | H10282032 A | 10/1998 |

OTHER PUBLICATIONS

Jie Zheng, First Search: International Application No. 20181043239.7 Original and English Translation, dated Mar. 11, 2020, State Intellectual Property Office, China.

* cited by examiner

BUILT-IN ELECTRODE ELECTRICAL CAPACITANCE TOMOGRAPHY SENSOR

PRIORITIES AND CROSS REFERENCES

This Application claims priority from International Application No. PCT/CN2019/084748 filed on 28 Apr. 2019 and Chinese Application No. 201810432339.7 filed on 8 May 2018 the teachings of each of which are incorporated by reference herein in their entirety.

TECHNICAL FIELD

The present application relates to a built-in electrode type electrical capacitance tomography sensor, and belongs to the field of sensor design.

BACKGROUND

Electrical Capacitance Tomography (referred to as ECT) is one of process tomography technologies. Its basic principle is that different materials have different dielectric constants. By arranging multi-electrode capacitance sensor outside the object to be measured, when the medium state at the cross-section where measurement electrodes are located changes, the equivalent dielectric constant will change, which will cause the change of capacitance value between the electrode pairs measured by the sensor. With the corresponding image reconstruction algorithm, the medium distribution at the measured cross-section can be obtained.

When ECT is applied to high-temperature system, the key difficulty is the production of high temperature resistant ECT sensor, which is the most critical to realize the application of the high temperature resistant ECT. The development of high temperature resistant and built-in electrode ECT sensor is particularly important, but its production is more complicated.

There are several key problems that need to be solved when designing the high temperature resistant and built-in electrode ECT sensor.

The first problem refers to material, the selected electrode material must have good high temperature resistance and conductivity, and meet the requirements of easier processing and relatively low price; the supporting outer tube relied for fixing sensor must be a high temperature-resistant insulator; the high temperature-resistant and insulating material needs to not only meet the isolation and support of the entire sensor electrode in a high temperature environment, but also meet the requirements for insulation and fixing of the metal outer tube that plays the role of the sensor frame and shielding. There are no ready-made products for high temperature resistant signal transmission cables. Thus, it is inevitable to choose suitable materials for cable cores, high temperature resistant and insulating tubes, and shielding mesh materials to make them yourself. All selected materials must ensure that the entire sensor has good performance and long working life under high temperature environments.

The second problem refers to process. In order to achieve the purpose of measurement, the electrode sheets of the ECT sensor need to be closely attached to the inner wall of the container to be measured through corresponding technical means, which must have good electrical performance at high temperature. Since the imaging realized by ECT refers to measurement of extremely small capacitance value, the size and arrangement of the electrode sheet must be strictly accurate. Further, to ensure that the electrode sheets are evenly and firmly fixed to the inner wall of the container and the electrode sheets are in good position during the fixation and future operation, the selection of electrode materials and the production method and fixing process of the electrode sheet is very important.

The third problem refers to interference-free means of signal. The collected weak electrical signals need to avoid interference and be transmitted to a receiving device, and thus effective shielding techniques must be used. It is necessary to choose suitable materials to specially make a high temperature resistant and shielding signal transmission line which is, by reasonable technology, connected with the normal temperature section-signal transmission line connected to the ECT signal acquisition system. At the same time, the connection of the electrode sheet and the signal transmission cable requires a special method. The connection between the high temperature section-transmission signal line and the normal temperature section-signal transmission line, and the connection among the shielding tubes outside the grounding cable shielding mesh also need to be achieved by suitable method.

Due to many challenges in the manufacture of high temperature resistant ECT sensors, most of the domestic and abroad research on ECT sensors is conducted at room temperature.

SUMMARY

According to one aspect of the present application, there is provided a built-in electrode electrical capacitance tomography sensor, wherein, the electrical capacitance tomography sensor is barrel in shape, which sequentially comprises, from inside to outside, array-distributed electrodes, an electrode-insulating sleeve, a flange outer tube, an insulating tube and a signal transmission line;

wherein, the array-distributed electrodes are N electrode sheets, each of which has the same size and consists of a measuring end and a fixed end, wherein, N is an integer in a range from 8 to 16.

the electrode is connected to the electrical capacitance tomography signal acquisition system through the signal transmission line, and the collected capacitance data are transmitted to the electrical capacitance tomography signal acquisition system via the signal transmission line, and then transmitted to an imaging computer to complete image reconstruction.

Preferably, the array-distributed electrodes are formed by tile-shaped electrodes with an arc cross section, which are made from high temperature resistant metal conductors through turning and wire cutting processes.

Preferably, the outer arc surface of the tile-shaped electrode is provided with a metal screw stein which is used to fix the electrode.

Preferably, the tile-shaped electrodes is uniformly fixed on an inner wall of the electrode insulating sleeve by positioning of the metal screw stein, the electrode screw stein passes through both the electrode insulating sleeve and the flange outer tube, an outer end of the metal screw stein is sleeved with the insulating tube, which makes the electrode screw stein insulated from the flange outer tube.

Preferably, the insulating tube includes two thick and thin sections with the same inner diameter and different outer diameters.

Preferably, an inner diameter of the electrode insulating sleeve is consistent with the diameter of a concentric circle where the outer arc surface of the array-distributed electrode is located, and an outer diameter of the electrode insulating sleeve is consistent with an inner diameter of the flange outer tube, a length of the electrode insulating sleeve is greater than or equal to a length of the array-distributed electrode, the electrode insulating sleeve is sleeved with the flange outer tube at its outside, and the flange outer tube is longer than the electrode insulating sleeve.

Preferably, the sides of both the electrode insulating sleeve and the flange outer tube are provided with small holes and the position of the hole is consistent with the position of the electrode screw stein.

More preferably, the diameter of the hole matches with the diameter of the thin section of the insulating tube.

Preferably, two ends of both the array-distributed electrode and the electrode insulating sleeve are provided with an inner layer insulation ring and an outer layer insulation ring.

Preferably, inner and outer diameters of the inner insulation ring are the same as respective diameters of the concentric circles where inner and outer arcs of the tile-shaped electrode with an arc cross section are located, and inner and outer diameters of the outer insulation ring are the same as inner and outer diameters of the electrode insulating sleeve respectively.

Preferably, both a total length of the electrode and the two inner insulation rings and a total length of the electrode insulating sleeve and the two outer insulation rings are the same as the length of the metal flange outer tube.

Preferably, two flange leading tubes with the same inner diameter as an inner arc diameter of the electrode are connected to both ends of the flange outer tube to seal the inner and outer insulation rings and form a section of communicated pipeline with the same inner diameter.

Preferably, the signal transmission line comprises a high temperature section-signal transmission line and a normal temperature section-signal transmission line, and both the high temperature section-signal transmission line and the normal temperature section-signal transmission line are a shielding line consisting of a cable core, an insulating layer and a shielding wire mesh.

Preferably, the electrode is connected to an electrical capacitance tomography signal acquisition system through both the cable core of the high temperature section-signal transmission line and the cable core of the normal temperature section-signal transmission line, the collected capacitance data are transmitted to the electrical capacitance tomography signal acquisition system via two sections of the signal transmission line, and then transmitted to an imaging computer to complete image reconstruction.

Preferably, one end of the cable core of the high temperature section-signal transmission line is provided with a metal disc which is fixed on the electrode screw stein, the other end of the cable core of the high temperature section-signal transmission line is connected to the cable core of the normal temperature section-signal transmission line, and the shielding wire meshes of the two sections of the signal transmission line are connected separately.

Preferably, the shielding wire mesh of the high temperature section-signal transmission line is connected to the flange outer tube to complete the signal shielding.

Preferably, the electrical capacitance tomography sensor is applied to a temperature environment ranging from room temperature to a high temperature of 1000° C.

Preferably, all elements of the electrical capacitance tomography sensor can be resistant to a high temperature of 1000° C.

The benefits achieved by the present application comprises:

(1) Considering the defect that the signal transmission line used in the traditional cold ECT is not resistant to high temperature, the signal transmission line is divided into a high temperature section and a normal temperature section, and thus can be resistant to a high temperature of 1000° C.

(2) Array-distributed electrodes are used to measure capacitance. The electrode and the disc connected to the cable core of high-temperature signal transmission line are fastened to the electrode screw stein via screws to ensure that the connection between the signal transmission cable and the measurement electrode remains unobstructed in a high temperature environment.

(3) Two axial ends of both the electrode and the electrode insulating sleeve are placed into the inner insulation ring and the outer insulation ring to ensure a good insulation effect between the electrode and the outside.

(4) The designed built-in electrode ECT sensor can be normally applied to the two-dimensional distribution imaging of the medium in the tube in the temperature ranging from normal temperature to a high temperature of 1000° C.; and the influence of the wall surface is eliminated to truly reflect the state of the medium in the tube, which effectively broadens the application of ECT technology in the field of high temperature and thermal conditions.

A list of elements and numeral references:
1—array-distributed electrode; 2—electrode insulating sleeve; 3—metal flange outer tube; 4—insulating tube; 5—inner insulation ring; 6—outer insulation ring; 7—flange leading tube; 8—electrode fixing nut; 9—signal wire fixing nut; 10—flange fastening screw; 11—high temperature section-signal transmission line; 12—normal temperature section-signal transmission line; 13—signal acquisition system; 14—computer imaging display system.

DETAILED DESCRIPTION

According to one aspect of the present application, there is provided a built-in electrode electrical capacitance tomography sensor, wherein, the electrical capacitance tomography sensor is barrel in shape, which sequentially comprises, from inside to outside, array-distributed electrodes, an electrode-insulating sleeve, a flange outer tube, an insulating tube, and a signal transmission line;

wherein, the array-distributed electrodes are N electrode sheets, each of which has the same size and consists of a measuring end and a fixed end, wherein, N is an integer in a range from 8 to 16;

the electrode is connected to the electrical capacitance tomography signal acquisition system through the signal transmission line, and the collected capacitance data are transmitted to the electrical capacitance tomography signal acquisition system via the signal transmission line, and then transmitted to an imaging computer to complete image reconstruction.

In a preferable embodiment of the present application, the array-distributed electrodes are formed by tile-shaped electrodes with an arc cross section, which are made from high temperature resistant metal conductors through turning and wire cutting processes.

In a preferable embodiment of the present application, the outer arc surface of the tile-shaped electrode is provided with a metal screw stein which is used to fix the electrode.

In a preferable embodiment of the present application, the tile-shaped electrodes are uniformly fixed on an inner wall of the electrode insulating sleeve by positioning of the metal screw stein, the electrode screw stein passes through both the electrode insulating sleeve and the flange outer tube, an outer end of the metal screw stein is sleeved with the insulating tube, which makes the electrode screw stein insulated from the flange outer tube.

In a preferable embodiment of the present application, the insulating tube includes two thick and thin sections with the same inner diameter and different outer diameters.

In a preferable embodiment of the present application, an inner diameter of the electrode insulating sleeve is consistent with the diameter of a concentric circle where the outer arc surface of the array-distributed electrode is located, and an outer diameter of the electrode insulating sleeve is consistent with an inner diameter of the flange outer tube, a length of the electrode insulating sleeve is greater than or equal to a length of the array-distributed electrode, the electrode insulating sleeve is sleeved with the flange outer tube at its outside, and the flange outer tube is longer than the electrode insulating sleeve.

In a preferable embodiment of the present application, the sides of both the electrode insulating sleeve and the flange outer tube are provided with small holes and the position of the hole is consistent with the position of the electrode screw stein.

In a preferable embodiment of the present application, the diameter of the hole matches with the diameter of the thin section of the insulating tube.

In a preferable embodiment of the present application, two ends of both the array-distributed electrode and the electrode insulating sleeve are provided with an inner layer insulation ring and an outer layer insulation ring.

In a preferable embodiment of the present application, inner and outer diameters of the inner insulation ring are the same as respective diameters of the concentric circles where inner and outer arcs of the tile-shaped electrode with an arc cross section are located, and inner and outer diameters of the outer insulation ring are the same as inner and outer diameters of the electrode insulating sleeve respectively.

In a preferable embodiment of the present application, both a total length of the electrode and the two inner insulation rings and a total length of the electrode insulating sleeve and the two outer insulation rings are the same as the length of the metal flange outer tube.

In a preferable embodiment of the present application, two flange leading tubes with the same inner diameter as an inner arc diameter of the electrode are connected to both ends of the flange outer tube to seal the inner and outer insulation rings and form a section of communicated pipeline with the same inner diameter.

In a preferable embodiment of the present application, the signal transmission line comprises a high temperature section-signal transmission line and a normal temperature section-signal transmission line, and both the high temperature section-signal transmission line and the normal temperature section-signal transmission line are a shielding line consisting of a cable core, an insulating layer and a shielding wire mesh.

In a preferable embodiment of the present application, the electrode is connected to an electrical capacitance tomography signal acquisition system through both cable core of the high temperature section-signal transmission line and the cable core of the normal temperature section-signal transmission line, the collected capacitance data are transmitted to the electrical capacitance tomography signal acquisition system via two sections of the signal transmission line, and then transmitted to an imaging computer to complete image reconstruction.

In a preferable embodiment of the present application, one end of the cable core of the high temperature section-signal transmission line is provided with a metal disc which is fixed on the electrode screw stein, the other end of the cable core of the high temperature section-signal transmission line is connected to the cable core of the normal temperature section-signal transmission line, and the shielding wire meshes of the two sections of the signal transmission line are connected separately.

In a preferable embodiment of the present application, the shielding wire mesh of the high temperature section-signal transmission line is connected to the flange outer tube to complete the signal shielding.

In a preferable embodiment of the present application, the electrical capacitance tomography sensor is applied to a temperature environment ranging from room temperature to a high temperature of 1000° C.

In a preferable embodiment of the present application, all elements of the electrical capacitance tomography sensor can be resistant to a high temperature of 1000° C.

The present invention will be described in detail below with reference to the accompanying figures. It should be understood that the protection scope of the present invention is not limited to the preferred embodiments described below.

Figure 2:
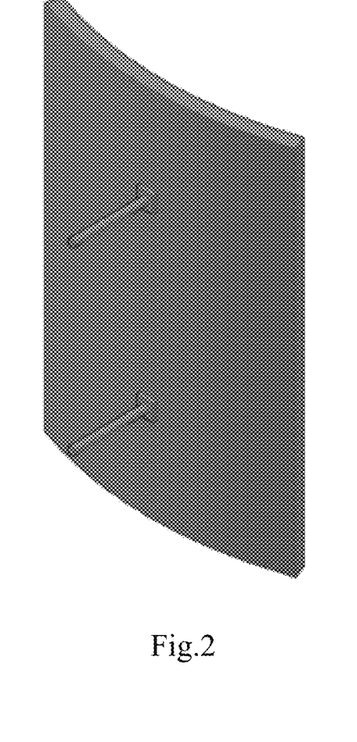
FIG. 2 is a schematic diagram of a single electrode of array-distributed electrodes made from high temperature resistant metal conductors through turning and wire cutting processes according to an embodiment of the present invention.

FIG. 2 is a schematic diagram of array-distributed electrodes according to an embodiment of the present invention. As shown in FIG. 2, the array-distributed electrodes consist of 8 electrode sheets of the same size. The 8 electrode sheets are made from stainless steel rods by the turning process and the wire cutting process into tile shape with an arc cross section. The cut electrode in arc and tile shape has an outer diameter equal to the inner diameter (46 mm) of the electrode insulating sleeve which is a quartz tube. The cut electrode in arc and tile shape has a length of 50 mm and a thickness of 2 mm By argon arc welding process, the outer arc surface of the cut electrode is welded with two M2.5 stainless steel screw stems with a length of about 10 mm, which are used to fix electrodes and used as signal transmission ends for connecting cables to measure capacitance, wherein the distance between the screw stems is 25 mm.

Figure 1:
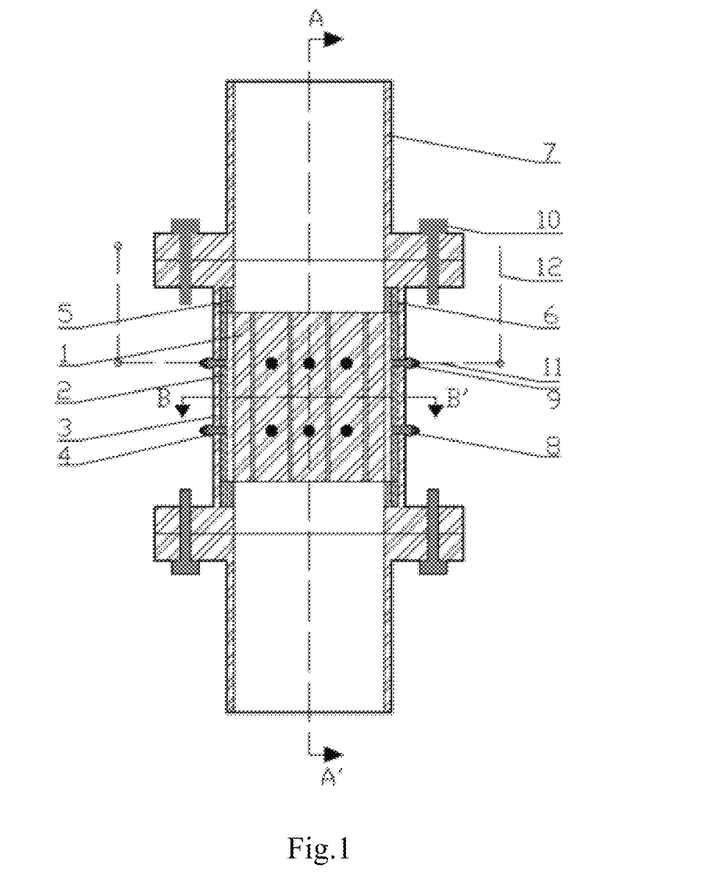
FIG. 1 is a schematically structural diagram of a high temperature resistant sensor according to an embodiment of the present invention.
Figure 3:
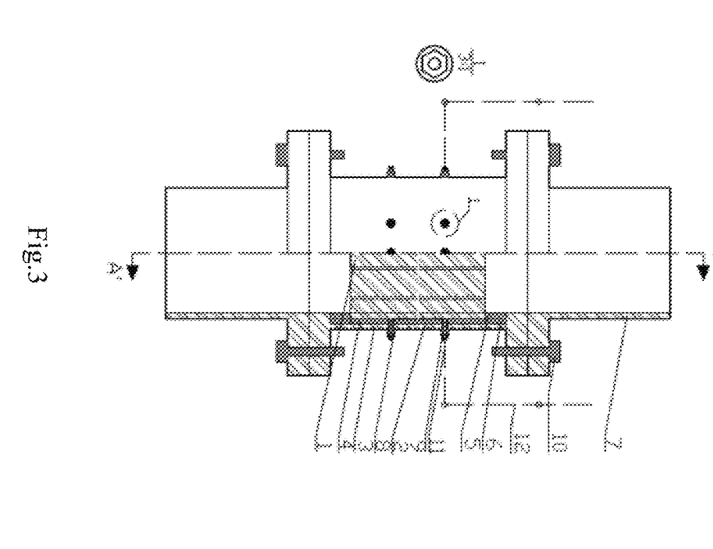
FIG. 3 is a schematically longitudinal section view (a view in the direction of A-A') of the high temperature resistant sensor shown in FIG. 1.
Figure 4:
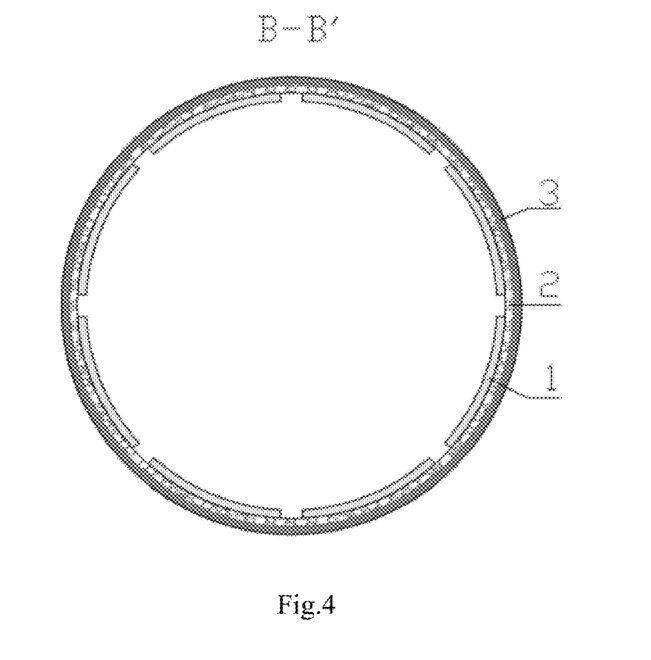
FIG. 4 is a schematically cross section view (a view in the direction of B-B') of the high temperature resistant sensor shown in FIG. 1.

FIG. 1 is a schematically structural diagram of a sensor (hereinafter referred to as an ECT sensor) according to an embodiment of the present invention. FIGS. 3 and 4 are schematically longitudinal section view (A-A) and cross section (B-B') of the sensor shown in FIG. 1, respectively.

As shown in FIG. 1, the ECT sensor comprises array-distributed electrodes 1, an electrode insulating sleeve 2, a metal flange outer tube 3, an insulating tube 4, an inner insulation ring 5, an outer insulation ring 6, a flange leading tube 7, an electrode fixing nut 8, a signal wire fixing nut 9, a flange fastening screw 10, a high temperature section-signal transmission line 11, and a normal temperature section-signal transmission line 12. The array-distributed electrodes 1 of the ECT sensor in the present invention are uniformly fixed to the inner wall of the pre-perforated insulating sleeve 2 by screw stems welded on the back. The insulating sleeve 2 is a side-perforated quartz glass cylindrical tube with a length of 50 mm, an outer diameter of 50 mm, an inner diameter of 46 mm. The metal flange outer tube 3 is made from stainless steel material and is processed into a round tube by means of turning. Its two ends are welded to uniform holes on the sides of the flange. The metal flange outer tube 3 has a length of 80 mm, an inner diameter of 50 mm and an outer diameter of 55 mm. The outside of the electrode insulating sleeve 2 is sleeved with a metal flange outer tube 3. The sides of the electrode insulating sleeve 2 and the metal flange outer tube 3 are pre-punched, and the pre-punched hole position is strictly consistent with the position of the screw stem on the electrode 1. The pre-punched hole has a diameter of 6 mm. The electrode screw stem passes through the electrode insulating sleeve 2 and the metal flange outer tube 3 via the holes. The outside of the electrode screw stem is sleeved with the insulating tube 4 so as to make sure that the electrode screw stem is insulated from the metal flange outer tube, and then the electrode fixing nut 8 is fixed at the thick end of the insulating tube. The inner insulation ring 5 of the ECT sensor is a quartz tube with an outer diameter of 46 mm, a wall thickness of 2 mm and a length of 15 mm. The outer insulation ring 6 is quartz tube of the same type as the electrode insulating sleeve and has a length of 15 mm. The two axial ends of both the electrode and the electrode insulating sleeve are placed into the inner insulation ring and outer insulation ring, respectively. The flange leading tube 7 of the ECT sensor is made from stainless steel and is processed into a round tube by means of turning. Its one end is welded to the flange. It has an inner diameter of 42 mm and an outer diameter of 47 mm. The flange leading tube and the metal flange outer tube are connected via the flange, and after the inner and outer insulation rings are sealed, the flange fastening screws 10 are fastened to complete the manufacture of the body of the sensor. The signal transmission line of the ECT sensor comprises a high temperature section and a normal temperature section. The high temperature section-signal transmission line 11 consists of a stainless steel wire with a diameter of 1 mm as cable core, and a shielding line as an insulating layer, wherein the cable core is welded on a stainless steel disc with a hole having a diameter of 3 mm at one end, and the shielding line consists of a corundum tube with an inner diameter of 1.5 mm and a stainless steel mesh sleeved outside the corundum tube. The normal temperature section-signal transmission line 12 is an ordinary shielding line consisting of a cable core, an insulating layer and a shielding wire mesh. The ECT sensor fixes the disc welded at one end of the cable core of the high temperature section-signal transmission line 11 to the electrode screw stem via a transmission line fixing nut 9 (M2.5 stainless steel nut). The other end of the cable core is connected to the cable core of the normal temperature section-signal transmission line 12. The signal cable shielding wire meshes of the two sections are connected. The ECT sensor connects the shielding wire mesh of the high temperature section-signal transmission line 11 to the metal flange outer tube 3 and the flange leading tube 7 so as to complete the signal shielding.

Figure 5:
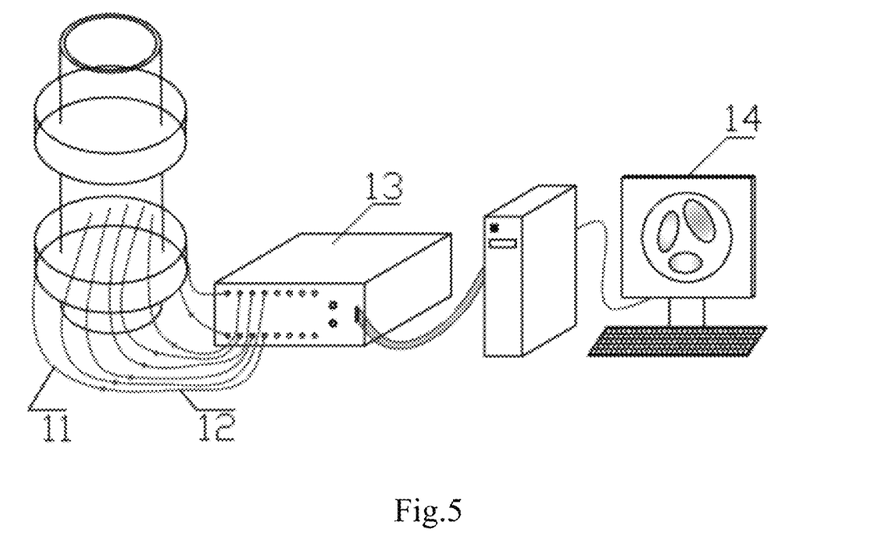
FIG. 5 is a schematic diagram of a system comprising the sensor of the present invention.
Figure 6:
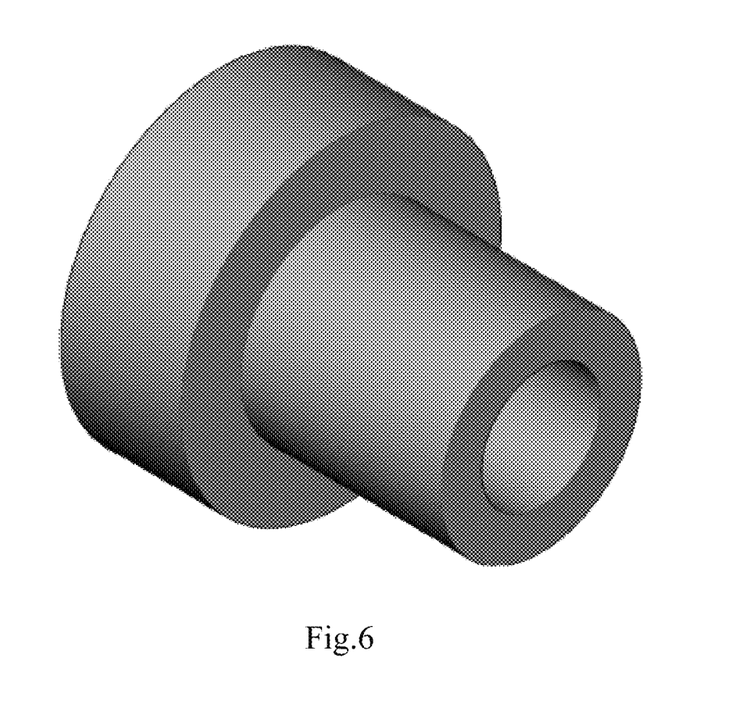
FIG. 6 is a schematic diagram of the insulating tube structure.

FIG. 5 is a schematic diagram of an ECT system comprising the ECT sensor according to the present invention. Through the cable core of the high temperature section-signal transmission line 11 and further the cable core of the normal temperature section-signal transmission line 12 connected thereto, the array-distributed electrodes are connected to the ECT signal acquisition system 13. The measured capacitance data is then transmitted to the ECT computer imaging display system 14 through the data acquisition card so as to complete the image reconstruction through the corresponding algorithm. One end of the shielding wire mesh of the high temperature section-signal transmission line 11 is in contacting connection with the metal flange outer tube 3 of the ECT sensor. The other end thereof is connected to the ground line of the ECT signal acquisition system 13 via the shielding wire mesh of the normal temperature section-signal transmission line 12 connected to the shielding wire mesh of the high temperature section-signal transmission line 11.

The high temperature resistant ECT sensor in Figures comprises 8 measuring electrodes. However, according to the needs of the ECT signal acquisition system 13 used, 16 measuring channels can be used. Therefore, the number of the array-distributed measuring electrodes of the sensor in the present invention can be any integer ranging from 8 to 16. The calculation method of the outer arc length (width) of each measuring electrode is $w=\pi d/N-\delta$, wherein w represents the electrode width, d represents the inner diameter of the electrode insulating sleeve 2, N represents the number of the array-distributed electrodes, and $\delta$ represents the distance between adjacent electrodes. In the illustrated embodiment, the distance $\delta$ between the electrodes is 1 mm, and thus the outer arc length of the electrode is 17.06 mm.

The aforesaid only show several embodiments of the present invention, and do not intend to limit the present invention in any manner. Though relatively preferred embodiments above disclose the present invention, they do not intend to limit the present invention. Without departing the scope of the technical solutions of the present invention, some variations or modifications made by the skilled in the art, who is familiar with this field by use of the above disclosed technical solutions, are all equal to the equivalent embodiments of the present invention, and fall within the scope of the technical solutions of the present invention.

The invention claimed is:

1. A built-in electrode electrical capacitance tomography sensor, wherein, the electrical capacitance tomography sensor is barrel in shape, which sequentially comprises, from inside to outside, array-distributed electrodes, an electrode insulating sleeve, a flange outer tube, an insulating tube and a signal transmission line;

wherein, the array-distributed electrodes are N electrode sheets, each of which have the same size and consists of a measuring end and a fixed end, and N is an integer in a range from 8 to 16; and the electrode is connected to the electrical capacitance tomography signal acquisition system through the signal transmission line, and the collected capacitance data are transmitted to the electrical capacitance tomography signal acquisition system via the signal transmission line, and then transmitted to an imaging computer to complete image reconstruction.

2. The electrical capacitance tomography sensor as claimed in claim 1, wherein, the array-distributed electrodes are formed by tile-shaped electrodes with an arc cross section, which are made from high temperature resistant metal conductors through turning and wire cutting processes.

3. The electrical capacitance tomography sensor as claimed in claim 2, wherein, an outer arc surface of the tile-shaped electrode is provided with a metal screw stem which is used to fix the electrode.

4. The electrical capacitance tomography sensor as claimed in claim 3, wherein, the tile-shaped electrodes are uniformly fixed on an inner wall of the electrode insulating sleeve by positioning of the metal screw stem, the metal screw stem passes through both the electrode insulating sleeve and the flange outer tube, an outer end of the metal screw stem is sleeved with the insulating tube, which makes the metal screw stem insulated from the flange outer tube.

5. The electrical capacitance tomography sensor as claimed in claim 1, wherein, the insulating tube comprises thick and thin two sections with the same inner diameter and different outer diameters.

6. The electrical capacitance tomography sensor as claimed in claim 5, wherein, an inner diameter of the electrode insulating sleeve is consistent with the diameter of a concentric circle where the outer arc surface of the array-distributed electrode is located, and an outer diameter of the electrode insulating sleeve is consistent with an inner diameter of the flange outer tube, a length of the electrode insulating sleeve is greater than or equal to a length of the array-distributed electrode, the electrode insulating sleeve is sleeved with the flange outer tube at its outside, and the flange outer tube is longer than the electrode insulating sleeve.

7. The electrical capacitance tomography sensor as claimed in claim 6, wherein, the sides of both the electrode insulating sleeve and the flange outer tube are provided with small holes and the position of the hole is consistent with the position of the metal screw stem.

8. The electrical capacitance tomography sensor as claimed in claim 7, wherein, the diameter of the hole matches with the diameter of the thin section of the insulating tube.

9. The electrical capacitance tomography sensor as claimed in claim 2, wherein, two ends of both the array-distributed electrode and the electrode insulating sleeve are provided with an inner insulation ring and an outer insulation ring.

10. The electrical capacitance tomography sensor as claimed in claim 9, wherein, inner and outer diameters of the inner insulation ring are the same as respective diameters of the concentric circles where inner and outer arcs of the tile-shaped electrode with an arc cross section are located, and inner and outer diameters of the outer insulation ring are the same as inner and outer diameters of the electrode insulating sleeve respectively.

11. The electrical capacitance tomography sensor as claimed in claim 10, wherein, both a total length of the electrode and two inner insulation rings and a total length of the electrode insulating sleeve and two outer insulation rings are equal to that of the flange outer tube.

12. The electrical capacitance tomography sensor as claimed in claim 1, wherein, two flange leading tubes with the same inner diameter as an inner arc diameter of the electrode are connected to both ends of the flange outer tube to seal the inner and outer insulation rings and form a section of communicated pipeline with the same inner diameter.

13. The electrical capacitance tomography sensor as claimed in claim 1, wherein, the signal transmission line comprises a high temperature section-signal transmission line and a normal temperature section-signal transmission line, and both the high temperature section-signal transmission line and the normal temperature section-signal transmission line are a shielding line consisting of a cable core, an insulating layer and a shielding wire mesh.

14. The electrical capacitance tomography sensor as claimed in claim 13, wherein, the electrode is connected to an electrical capacitance tomography signal acquisition system through both cable core of the high temperature section-signal transmission line and the cable core of the normal temperature section-signal transmission line, collected capacitance data are transmitted to the electrical capacitance tomography signal acquisition system via two sections of the signal transmission line, and then transmitted to an imaging computer to complete image reconstruction.

15. The electrical capacitance tomography sensor as claimed in claim 14, wherein, one end of the cable core of the high temperature section-signal transmission line is provided with a metal disc which is fixed on the metal screw stem, the other end of the cable core of the high temperature section-signal transmission line is connected to the cable core of the normal temperature section-signal transmission line, and the shielding wire meshes of the two sections of the signal transmission line are connected separately.

16. The electrical capacitance tomography sensor as claimed in claim 13, wherein, the shielding wire mesh of the high temperature section-signal transmission line is connected to the flange outer tube to complete the signal shielding.

17. The electrical capacitance tomography sensor as claimed in claim 1, wherein, the electrical capacitance tomography sensor is applied to a temperature environment ranging from room temperature to a high temperature of 1000° C.

18. The electrical capacitance tomography sensor as claimed in claim 17, wherein, all elements of the electrical capacitance tomography sensor are resistant to a high temperature of 1000° C.

* * * * *